(No Model.)

P. H. SOWASH.
JAW TRAP.

No. 434,842. Patented Aug. 19, 1890.

Witnesses.
A. Ruppert,
H. A. Daniels

Inventor.
Peter H. Sowash
Per
Thomas P. Simpson
Atty.

United States Patent Office.

PETER HARRISON SOWASH, OF SLIPPERY ROCK, PENNSYLVANIA.

JAW-TRAP.

SPECIFICATION forming part of Letters Patent No. 434,842, dated August 19, 1890.

Application filed April 16, 1890. Serial No. 348,244. (No model.)

*To all whom it may concern:*

Be it known that I, PETER HARRISON SOWASH, a citizen of the United States, residing at Slippery Rock, in the county of Butler and State of Pennsylvania, have invented certain new and useful Improvements in Jaw-Traps; and I do declare the following to be a full, clear, and exact description of the invention, such as will enable others skilled in the art to which it appertains to make and use the same, reference being had to the accompanying drawings, and to the letters of reference marked thereon, which form a part of this specification.

The special object of my invention is to improve that class of steel traps in which jaws are employed to clasp the animal about the body or one of the limbs.

My invention consists in making the shank of the pan longer than usual and providing one side with a stud, then combining with this an elbow trip-lever, which is fulcrumed to a side post, as hereinafter described.

Figure 1:
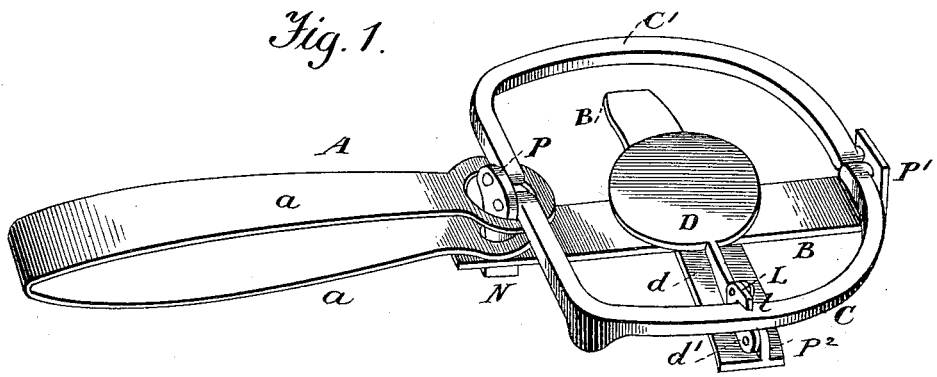
Figure 2:
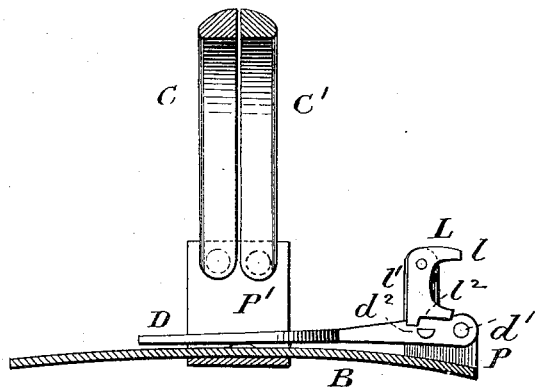
Figure 3:
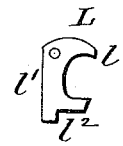
Figure 4:
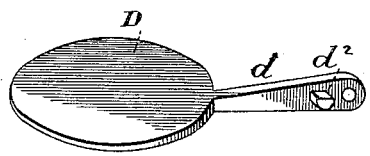

Figure 1 of the drawings is a perspective view showing the trap set; Fig. 2, a vertical cross-section showing the lever and stud not locked together; Fig. 3, a detail view of the lever, and Fig. 4 a similar view of the pan with its shank.

In the drawings, A represents the plate-spring of the trap with two end-apertured arms $a$ $a$, through the upper one of which passes the post P and through the other the jaws C C′. These jaws are trunnioned in the opposite posts P P′, one being integral with the base B, while the other is end threaded, passes through a hole thereof, and receives a nut N, so as to be detachable.

D is the pan provided with a long shank $d$, pivoted at $d'$ to a post $P^2$ and having a side stud $d^2$ between the pan and the shank-pivot $d'$. To the upper end of the post $P^2$ is fulcrumed a lever L, having the arms $l$ $l'$ $l^2$. In the vertex of the angle formed by the arms $l'$ $l^2$ fits the stud $d^2$, while the jaw C bears upwardly against the arm $l$, so as to make the arm $l^2$ press tightly against the stud $d^2$. This keeps the pan elevated until the animal bears upon it and causes it to be disengaged from the lever.

The advantages of my improvemens are that it makes the trap easier to set and more certain to fly up and catch the animal high on the muscles of the leg, where he cannot free himself by gnawing off the leg.

What I claim as new, and desire to protect by Letters Patent, is—

In a jaw-trap, the pivoted shank of the pan provided with a side stud and a three-armed lever fulcrumed to the upper end of the post, one of the jaws of the trap being held down by the upper arm and the said jaw-stud being held at the junction of the two lower arms, as shown, and for the purpose set forth.

In testimony whereof I affix my signature in presence of two witnesses.

PETER HARRISON SOWASH.

Witnesses:
FRANK P. EYTH,
T. L. McELHANY.